Figure 1:
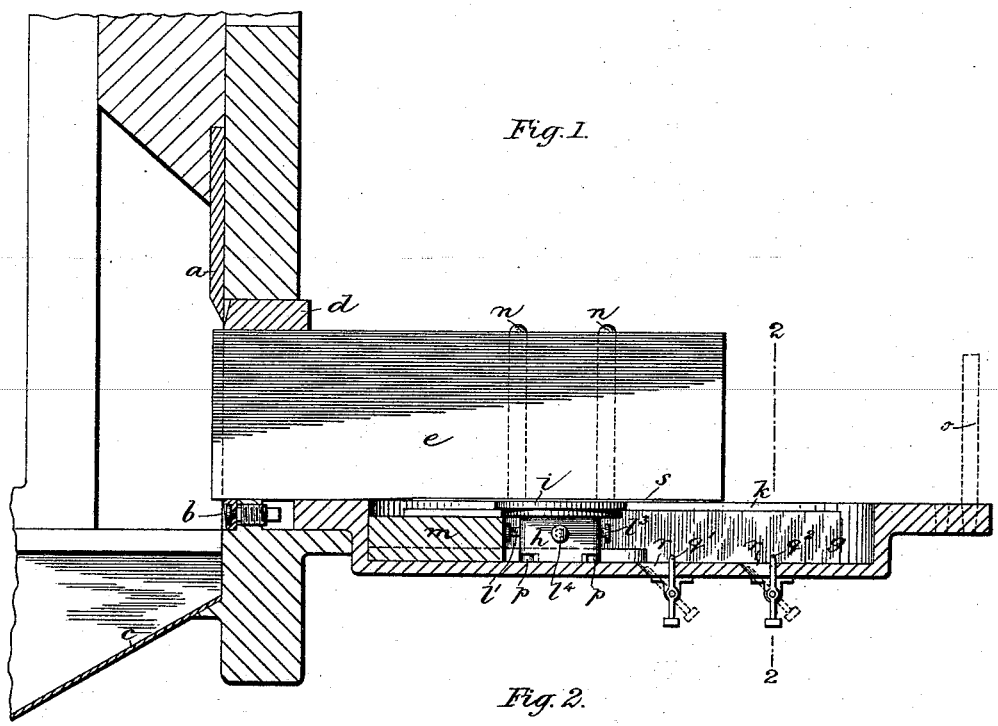

(No Model.) 5 Sheets—Sheet 1.

L. U. GILL & A. BRADLEY.
GUILLOTINE PAPER CUTTING MACHINE.

No. 439,817. Patented Nov. 4, 1890.

Witnesses
John Becker
Fred White

Inventors
Leonard Upcott Gill
and Alfred Bradley
By their Attorneys (No Model.) 5 Sheets—Sheet 2.
L. U. GILL & A. BRADLEY.
GUILLOTINE PAPER CUTTING MACHINE.
No. 439,817. Patented Nov. 4, 1890.
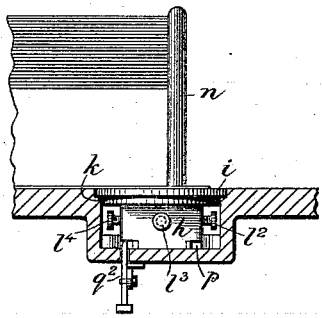
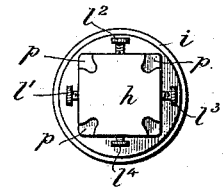
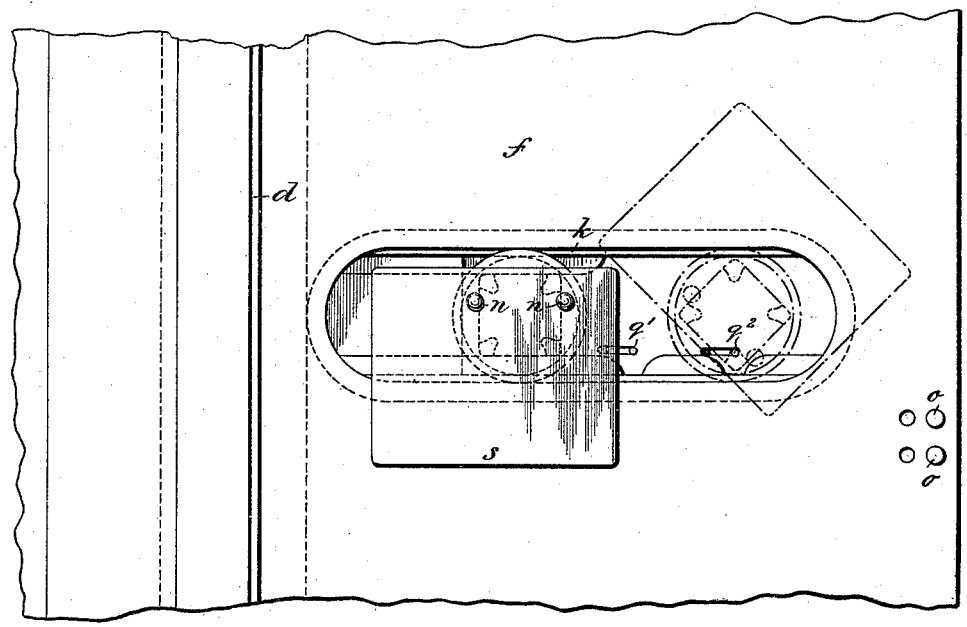
Witnesses
John Becker
Fred White
Inventors
Leonard Upcott Gill,
and Alfred Bradley,
By their Attorneys:
Arthur C. Fraser & Co.

(No Model.) 5 Sheets—Sheet 3.
L. U. GILL & A. BRADLEY.
GUILLOTINE PAPER CUTTING MACHINE.
No. 439,817. Patented Nov. 4, 1890.
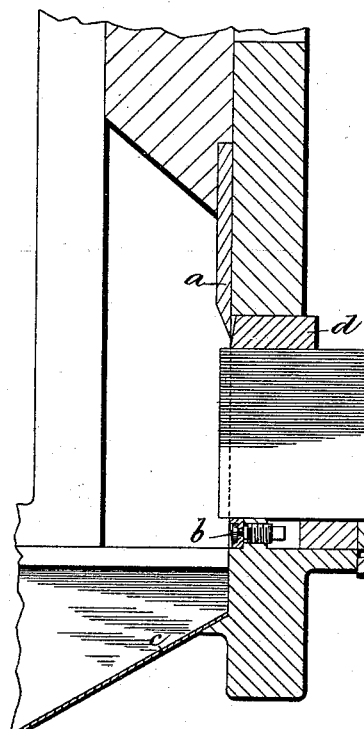
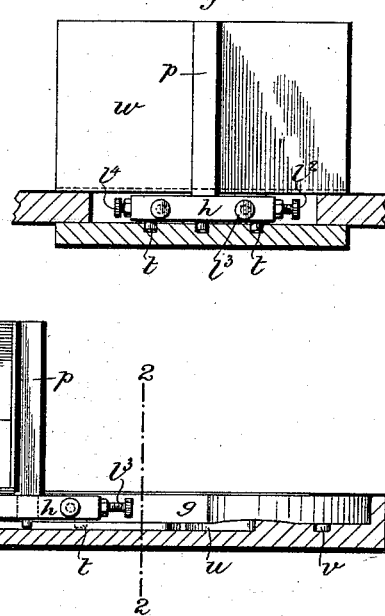
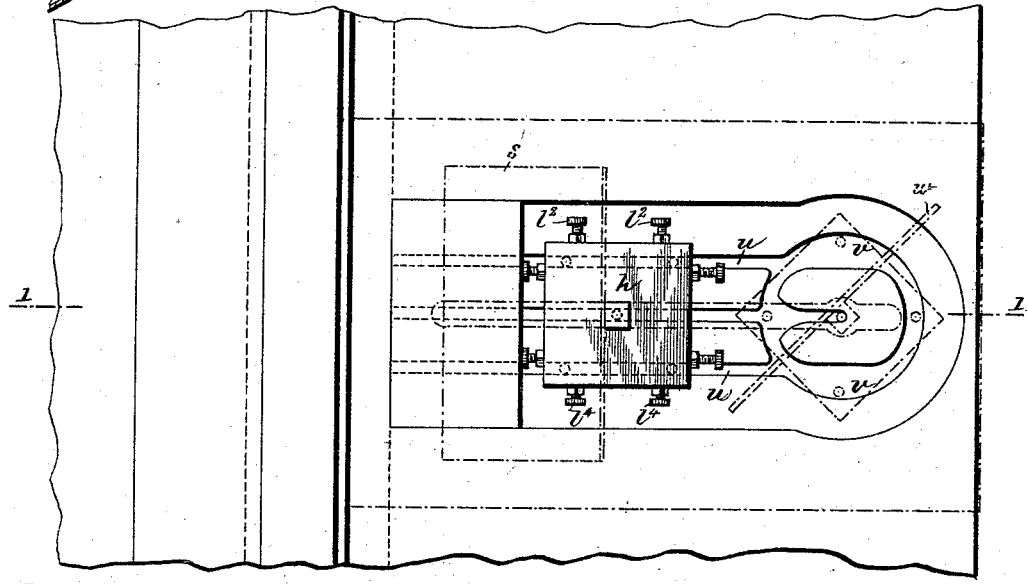
Witnesses
John Becker
Fred White
Inventors
Leonard Upcott Gill
and Alfred Bradley
By their Attorneys
Arthur C. Fraser & Co (No Model.) 5 Sheets—Sheet 4.
L. U. GILL & A. BRADLEY.
GUILLOTINE PAPER CUTTING MACHINE.
No. 439,817. Patented Nov. 4, 1890.
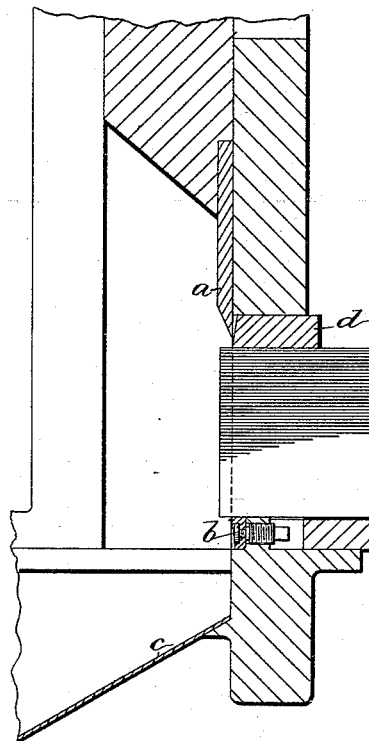
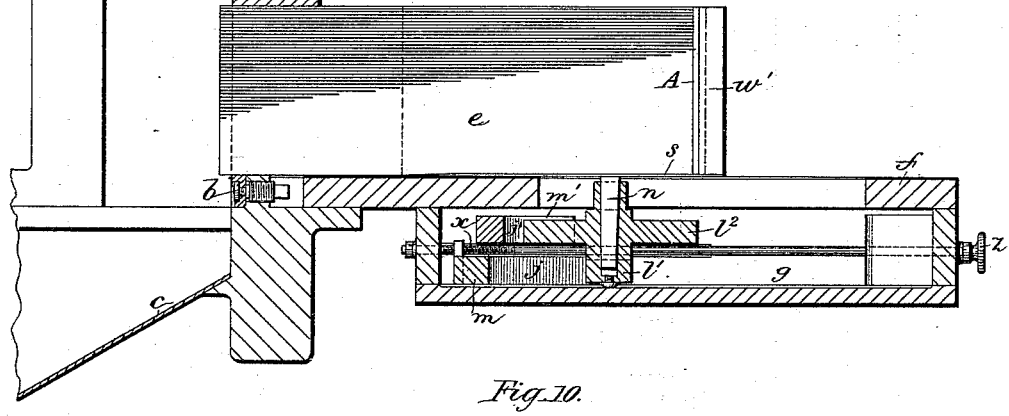
Fig. 9.
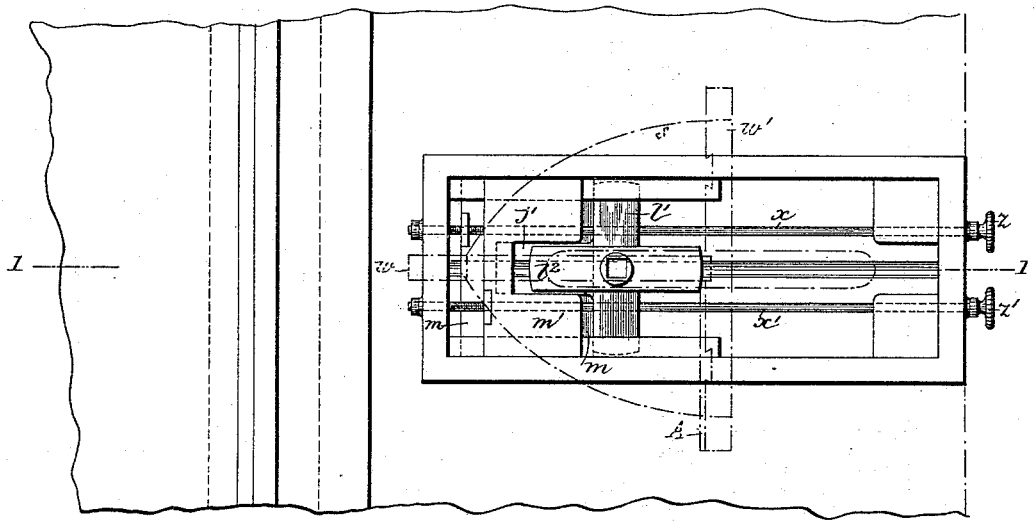
Fig. 10.
Witnesses
John Becker
Fred White
Inventors
Leonard Upcott Gill,
and Alfred Bradley.
By their Attorneys
Arthur C. Fraser & Co.

(No Model.) 5 Sheets—Sheet 5.

L. U. GILL & A. BRADLEY.
GUILLOTINE PAPER CUTTING MACHINE.

No. 439,817. Patented Nov. 4, 1890.

Witnesses
John Becker
Fred White

Inventors
Leonard Upcott Gill,
and Alfred Bradley,
By their Attorneys
Arthur C. Fraser & Co.

UNITED STATES PATENT OFFICE.

LEONARD UPCOTT GILL AND ALFRED BRADLEY, OF LONDON, ENGLAND; SAID BRADLEY ASSIGNOR TO SAID GILL.

GUILLOTINE PAPER-CUTTING MACHINE.

SPECIFICATION forming part of Letters Patent No. 439,817, dated November 4, 1890.

Application filed March 3, 1890. Serial No. 342,397. (No model.)

*To all whom it may concern:*

Be it known that we, LEONARD UPCOTT GILL and ALFRED BRADLEY, both of London, England, have invented certain new and useful Improvements in Guillotine Paper-Cutting Machines, of which the following is a specification.

This invention relates to guillotine paper-cutting machines, such as are used for trimming the edges of books, pamphlets, or folded newspapers. In these machines it is for most purposes necessary to provide for varying the width of cut every time or every second or third time. For example, in trimming a folded magazine or newspaper it is generally required to cut the top edge or "head," the fore edge, and the bottom edge or "tail." The fore edge should have a wider cut than the head, and sometimes a wider cut than the tail, and the cuts for the head and tail should as a rule be differentiated. Hitherto these machines have generally been constructed with a gage or stop at that side of the machine which faces the flat or cutting edge of the knife, while the feed-board has been at that side of the machine which faces the beveled or chamfered edge, and it has been necessary for the operator to pass his hands or arms under the knife when placing the material against the gage in position to be cut.

In the specification of an invention forming the subject of another application for patent of Leonard Upcott Gill, dated January 17, 1890, Serial No. 337,255, a machine is described in which the feed-board is at the side of the machine which faces the flat or cutting edge of the knife, the gage or stop being at the other side, and it is not necessary for the operator to pass his hands under the knife.

In the improved machine which forms the subject of our present invention both the feed-board and the gage or gages and stop or stops are at the side of the machine that faces the flat or cutting edge of the knife and the construction of the machine is much simplified.

The invention consists in the combination, with a feed-board at the side of the machine that faces the flat or cutting edge of the knife, of two or more gages adapted to be brought successively or as required into the operating position and to be moved in or on the feed-board toward and from the knife, and of one or more stops, which limit the forward movement of the gages, the gages and the stop or stops being adjustable relatively to each other, so that the width of the several cuts can be varied as required; also, in the combination, with said feed-board and with gages that move to and fro therein or thereon and with the stop or stops to said gages, of improved devices whereby the gages are automatically moved after each cutting operation so as to bring the next or another gage into the operating position.

The accompanying drawings represent so much of a guillotine paper-cutting machine as is necessary to illustrate our invention.

Figure 2:
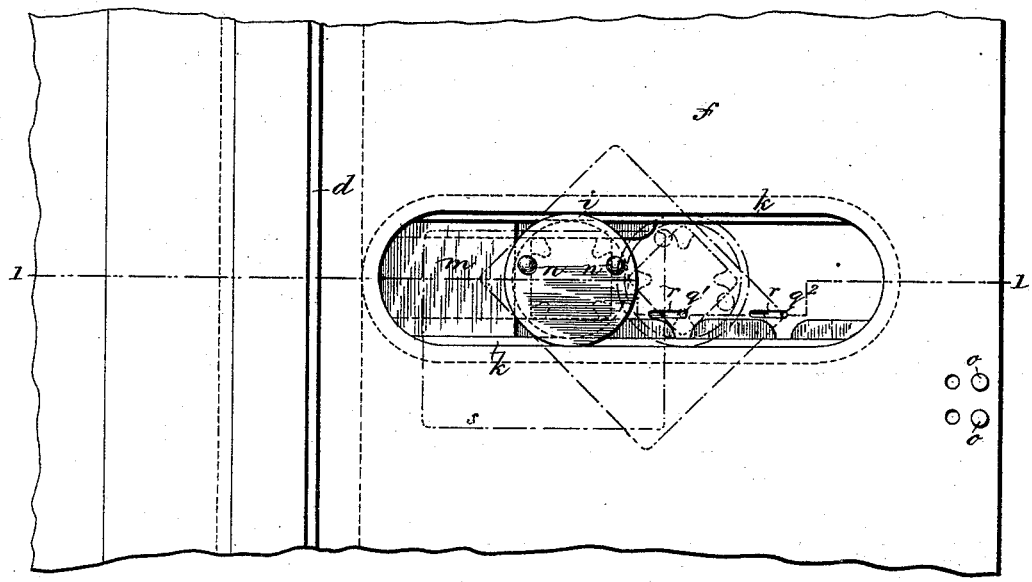

In the drawings, Figure 1 is a section on the broken line 1 1, Fig. 2, representing the preferred construction. Fig. 2 is a plan of same and shows in dotted lines the carrier $h$ and the plate $s$ in the act of turning on the first catch-pin $q'$. These views represent the gages in their most forward position—that is to say, the position they occupy at the time of the cut. Fig. 3 is a section on the line 2 2, Fig. 1. Fig. 4 is a plan showing in dotted lines the carrier $h$ and the plate $s$ in the act of turning on the second catch-pin $q^2$. Fig. 5 is a view of the under side of the gage-carrier and gages.

$a$ is the guillotine knife or cutter; $b$, an under-cutter bar; $c$, a chute to carry off the cuttings.

$d$ is the usual clamp, which descends slightly in advance of the knife, so as to hold the pile of paper during the cutting operation.

$e$, Fig. 1, is the pile of paper.

$f$ is the feed-board, and $g$ a longitudinal recess or slot therein forming a guideway for the gage-carrier and gages.

$h$ is is the gage-carrier. It is formed with a flange $i$ at its top to rest upon ledges $k$ $k$ on the feed-board.

$l'$ $l^2$ $l^3$ $l^4$ are four gages, only three of which, however, will be required for most purposes. These gages are in the form of screws, which can be screwed more or less into the carrier $h$, so as to regulate the width of cut by causing them in their forward movement to come later or sooner into contact with the stop $m$.

$n\ n$ are pins (an upright plate may be used in combination with or in lieu thereof) standing up from the gage-carrier to form a bearing for the back edge of the pile of papers to be cut.

$o\ o$ are gage-pins (one or more of which may be used) against which the head of the pile is placed. The position of these pins $o\ o$ is adjustable, and this can conveniently be effected by having holes to receive them at different distances from the edge of the feed-board.

$p\ p$ are recesses in the corners of the lower edge of the carrier $h$.

$q'\ q^2$ are pivoted catch-pins projecting through holes $r\ r$ in the bottom of the recess $g$, so as in the backward travel of the carrier $h$ to catch in one of the recesses $p$, and thereby cause the carrier to turn in a horizontal plane.

$s$ is a horizontal plate of any convenient shape and dimensions, fixed to the carrier $h$ for the purpose of partly supporting the pile of paper. It is shown in dots in Fig. 2 and in full lines in Fig. 4, both in the forward position.

The operation of the machine is as follows: The gage-carrier $h$ being in its back position, the pile of papers—say folded magazines—is placed upon the plate $s$ with the "back" edge against the upright pins $n\ n$ and its head against the pins $o\ o$. Three of the gages $l'\ l^2\ l^3$ have of course been previously adjusted, according to the width of cut of the tail, fore edge, and head, respectively. The pile is then pushed forward by hand, together with the gage-carrier, until the gage which for the time being faces the knife—say the gage $l'$—comes against the stop $m$. In this forward movement the catch-pins $q'\ q^2$ do not act, but move out of the way, as indicated in dotted lines in Fig. 1. The knife $a$ then comes down and effects the cut of, say, the tail of the pile. The pile is now drawn back, together with the carrier, and in this movement one of the recesses $p$ of the carrier comes in contact with the catch-pin $q'$, which causes the carrier to turn a quarter round, together with the pile of papers, so that the next gage $l^2$ and the fore edge of the pile face the knife. This backward movement of the carrier is not continued so far as the second catch-pin $q^2$. The carrier and pile are then again moved forward until the gage $l^2$ comes against the stop $m$. The knife, which has in the meantime risen, again descends and cuts the fore edge. The backward and forward movements are then again repeated, the gage $l^3$ coming against the stop $m$ and the head of the pile being cut. In the next following or third backward movement, as the fourth edge of the pile has not to be cut, the carrier is drawn back to the full extent—that is to say, sufficiently far for the second catch-pin $q^2$ to act upon it. It therefore gets two quarter-turns, and is brought into position for the first cut of the next pile of papers. The cut pile is now removed, a fresh pile put on the plate $s$, and the series of movements already described is repeated. If the machine be required for trimming piles of printed sheets on all four edges, all the gages will come into the operating position in succession, the carrier never being moved back as far as the catch-pin $q^2$. The gage-screws $l'\ l^2\ l^3\ l^4$ will also be all screwed up to the same gage if it be desired to cut an equal amount off all the four edges of the sheets.

Fig. 6 is a vertical section on the line 1 1 of Fig. 7; Fig. 7, a plan, and Fig. 8 a section on the line 2 2 of Fig. 6, illustrating a modification of the machine shown in Figs. 1 to 5. In this modification the gage-carrier $h$ has at its under side studs or projections $t\ t$, which run in longitudinal grooves $u\ u$, and these grooves are at their rear end widened out, as seen at $v$, so as to allow of the carrier $h$ being turned round by hand when in its drawn-back position. The carrier is shown with only one upright pin $p$, and to this pin an upright plate or board $w$ is affixed, against which the back edge of the pile of papers is placed.

Figure 11:
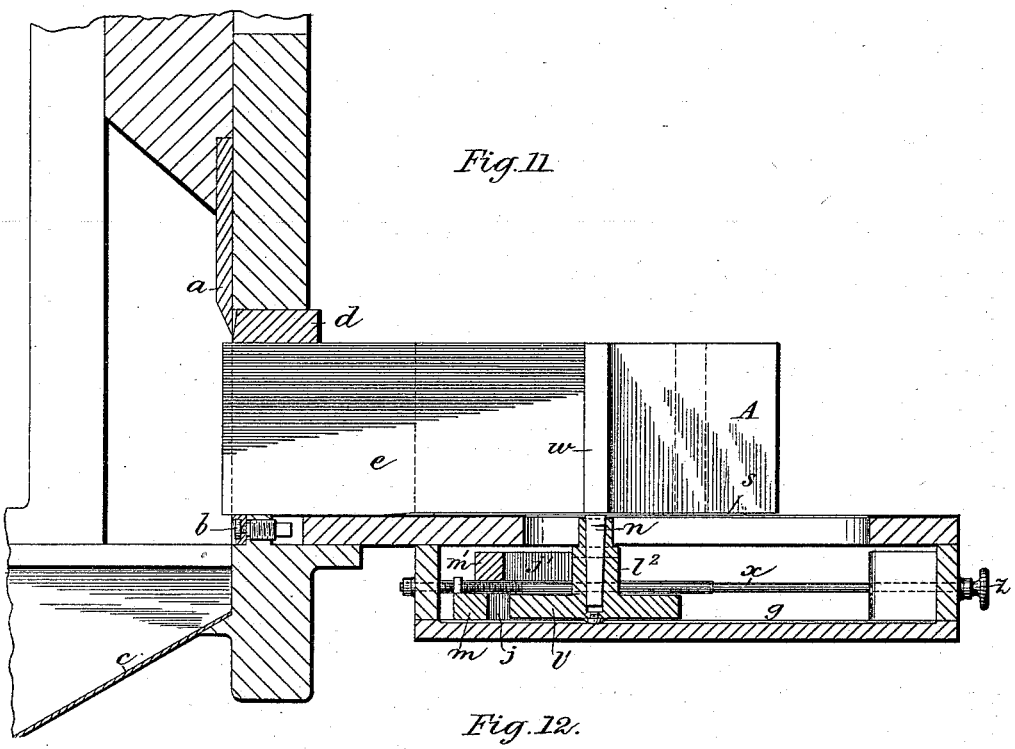
Figure 12:
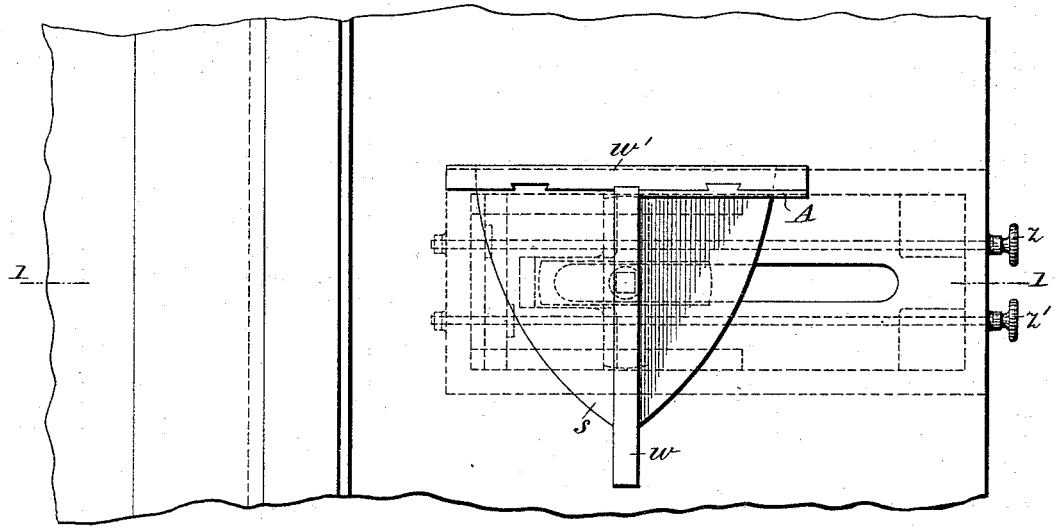

Figs. 9 to 12 represent a modification in which there are two superposed stops $m$ and $m'$, which, instead of the gages, are adjustable, and two corresponding superposed gages $l'\ l^2$, mounted on an upright pin $n$, that can be turned on its axis. Fig. 9 is a vertical section on the line 1 1, Fig. 10; Fig. 10 a plan showing the lower edge $l'$ in the operating position, and Figs. 11 and 12 are corresponding views showing the upper gage $l^2$ in the operating position. The stops $m$ and $m'$ are in the form of blocks, situated at the knife end of the recess $g$ in the feed-board, and their position—that is to say, their distance from the knife—can be adjusted as required by means of the screws $x$ and $x'$, working in nuts on the blocks and extending to the rear of the feed-board, where they are fitted with milled heads $z\ z'$ for turning them. The gage $l'$ is a bar fixed on the pin $n$, and the gage $l^2$ is a similar bar, also fixed on the pin $n$, at right angles to the gage $l'$, the two bars being shown as made of a single piece of metal. Fixed to the pin $n$ is an upright plate or board $w$, which carries another plate or board $w'$ at right angles thereto, the two plates or boards being together of $\perp$ form. The board $w'$ is formed with dovetails, and into the dovetail on the one side or the other of the junction with the board $w$ a dovetail filling-in piece A is inserted, the thickness of this piece being equal to the width of the cut at the tail of the pile.

The action of this machine is as follows: The stops $m\ m'$ having been adjusted, the head of a pile of paper of which it is desired to trim or cut the head, the tail, and the fore edge is placed in front of the angle of the $\perp$-piece $w\ w'$, which has not the filling-in piece A, and so as to rest partly on the plate s. The piece w w' is then pushed forward until the lower gage l' comes against the lower stop m, (see Figs. 9 and 10,) the front end of the gage l² entering a recess j', made for the purpose in the stop m'. The knife then comes down and performs the cut, say, of the tail. The pile is then drawn back, together with the piece w w'. This piece is then given a quarter-turn, (with the pile,) so as to cause the side of the part w to face the knife, Figs 11 and 12, the gages l' l² turning with it. The piece is then again advanced, pushing the fore edge under the knife, the distance being controlled by the gage l² coming against the stop m', the front end of the gage l' entering a recess j in the stop m. The pile which has thus been trimmed at the tail and the fore edge is then drawn back, together with the piece w w'. This piece is given a quarter-turn in the reverse direction, (to the position seen in Figs. 9 and 10,) and the pile is transferred to the other angle of the ⊥-piece—that is to say, with its tail against the filling-in piece A. A second pile of paper can now be placed with its head in the other angle of the ⊥-piece. The ⊥-piece is then pushed forward with the two piles until the lower gage l' comes against the stop m. The knife descends and simultaneously cuts the head of the first pile and the tail of the second. The first pile is therefore entirely trimmed, and when the two piles and ⊥-piece are again drawn back can be removed. The second pile is now given a quarter-turn and again advanced to have its fore edge cut. On being again drawn back it is in its turn transferred to the other angle of the ⊥-piece and a third pile inserted in its place, and so on. Filling or regulating pieces, such as A, of various thicknesses can be provided and be secured in dovetails in the board w' on either side or both sides of the board w, as desired. They can be employed as means of adjustment in combination with or instead of the adjustment by means of the screws x x', as already described.

What we claim, and desire to secure by Letters Patent, is—

1. In a guillotine paper-cutting machine, the combination, with a feed-board at the side of the machine that faces the flat or cutting edge of the knife, of gages adapted to be brought successively or as required into the operative position and to be moved with the material to be cut in or on the feed-board toward and from the knife, and a stop to limit the forward movement of said gages, the acting faces of said gages and of said stop being adjustable relatively to each other, so that the width of the several cuts can be varied as required, substantially as set forth.

2. In a guillotine paper-cutting machine, the combination, with a feed-board at the side of the machine that faces the flat or cutting edge of the knife, of gages below the material to be cut and adapted to be moved therewith in or on the feed-board toward and from the knife and brought automatically in succession into the operative position, and a fixed stop to limit the forward movement of said gages, substantially as set forth.

3. In a guillotine paper-cutting machine, the combination, with the feed-board f, having a longitudinal recess or slot g, of a stop m and a gage-carrier h, having adjustable gages affixed thereto, said gage-carrier being adapted to be moved to and fro in said recess and to be turned in a horizontal plane, so as to bring any one of said gages into the operative position, substantially as set forth.

4. In a guillotine paper-cutting machine, a gage-carrier h, adapted to be moved to and fro with the material to be cut, said gage-carrier having adjustable gages affixed thereto and recesses at its lower edge, in combination with a pivoted catch-pin adapted to engage with any one of said recesses, whereby in the backward travel of said carrier the carrier is caused to make a quarter-turn on its axis in a horizontal plane, substantially as and for the purpose set forth.

5. The pivoted catch-pin $q^2$, in combination with the traveling gage-carrier h, having recesses at its lower edge, and with the pivoted catch-pin $q'$, whereby when the carrier is moved sufficiently far in its backward travel it receives first a quarter-turn from the catch-pin $q'$ and then a second quarter-turn from the catch-pin $q^2$, substantially as and for the purpose set forth.

6. The combination, with the gage-carrier h, adapted to travel to and fro in or on the feed-board, and with the stop m, of the upright pins n n, and horizontal plate s, substantially as and for the purpose set forth.

In witness whereof we have hereunto signed our names in the presence of two subscribing witnesses.

LEONARD UPCOTT GILL.
ALFRED BRADLEY.

Witnesses:
JOHN C. MEWBURN,
GEORGE C. BACON.